US007138941B1

(12) United States Patent
Smith, Jr.

(10) Patent No.: US 7,138,941 B1
(45) Date of Patent: Nov. 21, 2006

(54) IN-SITU CALIBRATION OF RADAR FREQUENCY MEASUREMENT

(75) Inventor: Jerry Rosson Smith, Jr., Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 10/988,401

(22) Filed: Nov. 12, 2004

(51) Int. Cl.
*G01S 7/40* (2006.01)
(52) U.S. Cl. .............. 342/174; 342/165; 342/125; 342/126; 342/173
(58) Field of Classification Search .......... 342/165, 342/173, 174, 125, 126
See application file for complete search history.

(56) References Cited

U.S. PATENT DOCUMENTS

| 3,487,462 | A | * | 12/1969 | Holberg | 342/59 |
| 5,231,404 | A | * | 7/1993 | Gasiewski | 342/351 |
| 5,313,210 | A | * | 5/1994 | Gail | 342/25 A |
| 5,359,331 | A | * | 10/1994 | Adler | 342/124 |
| 5,471,211 | A | * | 11/1995 | Randall et al. | 342/26 D |
| 5,955,989 | A | * | 9/1999 | Li | 342/368 |
| 6,204,799 | B1 | * | 3/2001 | Caputi, Jr. | 342/25 R |
| 2004/0145514 | A1 | * | 7/2004 | Raney | 342/120 |
| 2006/0109173 | A1 | * | 5/2006 | Erikmats | 342/159 |
| 2006/0132357 | A1 | * | 6/2006 | Pozgay et al. | 342/174 |

OTHER PUBLICATIONS

"A bistatic polarimeter calibration technique", McLaughlin, D.J.; Ren, Z.; Wu, Y. Geoscience and Remote Sensing, IEEE Transactions on vol. 33, Issue 3, May 1995 pp. 796-799.*

"Calibration of bistatic polarimetric radar systems", Kahny, D.; Schmitt, K.; Wiesbeck, W. Geoscience and Remote Sensing, IEEE Transactions on vol. 30, Issue 5, Sep. 1992 pp. 847-852.*

"A performance analysis of several bistatic calibration techniques", Bradley, C.J.; Collins, P.J.; Terzuoli, A.J., Jr.; Temple, M.A.; Wilson, K.S.; Fortuny, J.; Lewis, G., IGARSS '01. Int'l, 2001 pp. 2572-2574 vol. 6.*

"Calibration of bistatic polarimetric scatterometers" Daout, F.; Khenchaf, A.; Saillard, J. Geoscience and Remote Sensing Symposium, 1996. IGARSS '96. 'Remote Sensing for a Sustainable Future.', Int'l vol. 1, May 27-31, 1996 pp. 746-748.*

Jerry R. Smith, Jr., Steven J. Russell, Barry E. Brown, Paul M. Haldeman, Jr., D. Dan Hayden, Donald G. Morgan, Robert D. Pierce, Jerry W. Shan, William T. Stephens III, and Mark S. Mirotznik, "Electromagnetic Forward-Scattering Measurements Over a Known, Controlled Sea Surface at Grazing IEEE Transactions on Geoscience and Remote Sensing," 11 pages.

Jerry R. Smith, Jr. and Robert J. Burkholder, "Channeling Phenomenon in Electromagnetic Forward Scattering a Low Grazing" IEEE Transactions on Geoscience and Remote Sensing, vol. 42, No. 8 Aug. 2004.

* cited by examiner

*Primary Examiner*—John B. Sotomayor
(74) *Attorney, Agent, or Firm*—Jacob Shuster

(57) ABSTRACT

Frequency calibration of a bi-static type of radar system is performed by positioning radar transmitter and receiver in spaced relation to each other over a targeted seawater surface from which radar radiation along a forward radiation scattering path is reflected toward the receiver while radar energy is also radiated along a direct path to the receiver by-passing the seawater during sequential frequency measurement tests to determine a frequency diffraction factor. A radiation blocking barrier is positioned by a floating support at a reflection location at an angular position on the seawater surface for intersection by the forward scattering path to block reflection of radar energy radiation toward the receiver during one of the measurement tests.

8 Claims, 2 Drawing Sheets

IN-SITU CALIBRATION OF RADAR FREQUENCY MEASUREMENT

The present invention relates generally to calibration of frequency measurement of radiation from a bi-static forward radiation scattering type of radar system.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

During operation of a radar system over a targeted radiation reflective surface such as terrain or seawater, the radar energy emitted from the transmitter is reflected from the targeted surface along a forward scattering path toward the receiver. The radar energy is also directly transmitted to the receiver along a line-of-sight path. Typically radar frequency measurement is calibrated for a mono-static type of radar system, wherein the targeted surface is illuminated by the emitted radar energy radiation a known distance from the transmitter and the collocated receiver. Such measurement calibration is however difficult to perform for a bi-static type of radar system, especially when the target surface is close by, because the radar radiation when impinging on the targeted surface it is scattered so as to corrupt the measurement calibration process. It is therefore an important object of the present invention to facilitate radar frequency calibration for the bi-static type of radar system.

SUMMARY OF THE INVENTION

Pursuant to the present invention, a radiation reflection blocker is positioned on a targeted surface within the target region before initiating a frequency measurement for a bi-static type of radar system, with forward radiation scattering thereby eliminated. The blocker is then removed during a following measurement test involving vertical adjustment of the receiver of the bi-static radar system in order to determine a diffraction correction factor to be utilized with the previously performed measurement so as to obtain a fully calibrated frequency measurement through a calculator.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF THE PREFERRED EMBODIMENT

Figure 1:
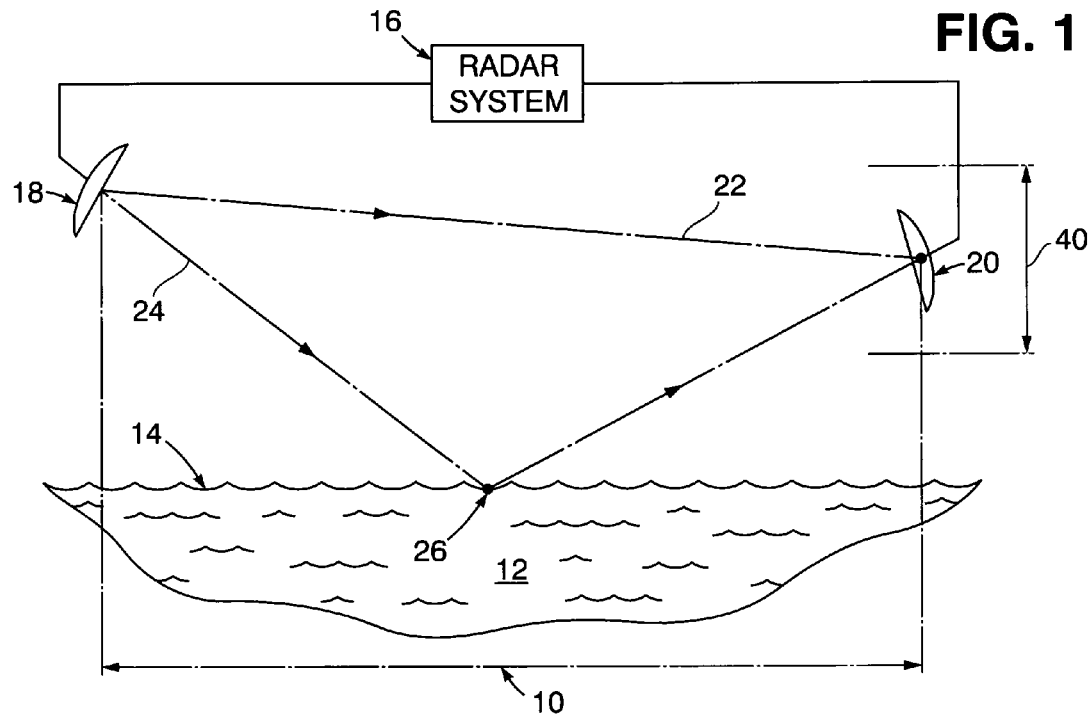
FIG. 1 is a side elevation view of a target region within which a bi-static radar system is positioned for initial forward scattering measurement of radar radiation along direct and reflection paths for determination of a diffraction correction factor.

Referring now to the drawing in detail, FIG. 1 illustrates a target region 10 on top of a body of seawater 12 on which a targeted surface 14 is positioned underlying a bi-static type of radar system 16 located above the targeted surface 14 on some support structure such as a bridge. A radar transmitter 18 and a receiver 20 are associated with the system 16, are located in spaced relation to each other so as to establish the target region 10 therebetween on the seawater surface 14. The transmitter 18 and receiver 20 are furthermore angularly positioned so that during a first initial radiation frequency measurement test, radiation energy is forwardly emitted from the transmitter 18 along a direct path 22 to the receiver 20 and along a radiation scattering path 24 to a radar bounce reflection point 26 on the targeted surface 14 within the region 10.

Figure 2:
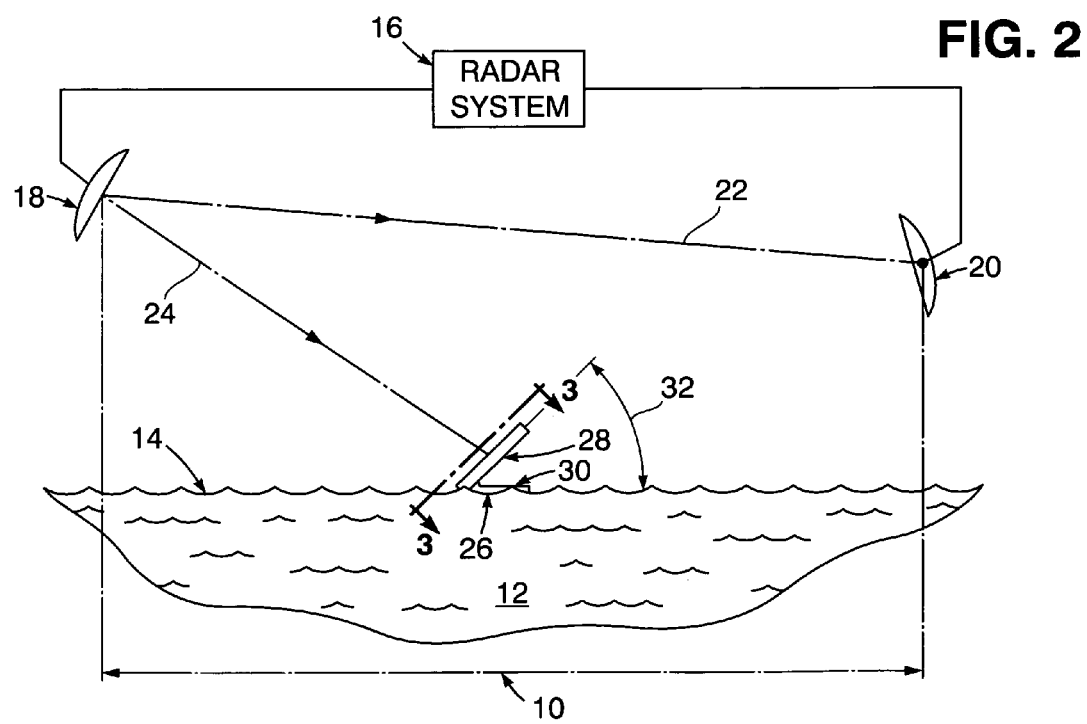
FIG. 2 is a side elevation corresponding to that of FIG. 1, with forward scattering bounce eliminated by positioning of a blocker in the target region.
Figure 3:
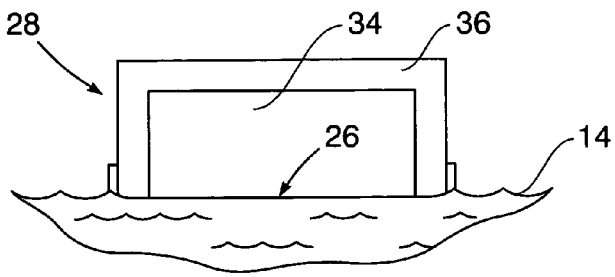
FIG. 3 is a front elevation view of the radiation blocker shown in FIG. 2 as seen from section line 3—3.

Pursuant to the present invention, as shown in FIG. 2 a radar radiation blocker 28 is positioned by a float support 30 on the targeted seawater surface 14 over the reflection point 26 after completion of the initial frequency measurement test as shown in FIG. 1. The blocker 28 is positioned at an angle 32, such as 30°, so as to be intersected by the forward radiation scattering path 24 to thereby block reflection onto the receiver 20. The blocker 28 is formed from a rectangular barrier plate 34 having a radar absorbing rim (RAM) 36 on top and sides thereof as shown in FIG. 3, so as to effectively mask the radar radiation energy radiated along the interrupted path 24 as shown in FIG. 2. A strong radar energy field is accordingly applied exclusively along the direct path 22 to the receiver 20 during performance of a second frequency calibration measurement test.

Figure 4:
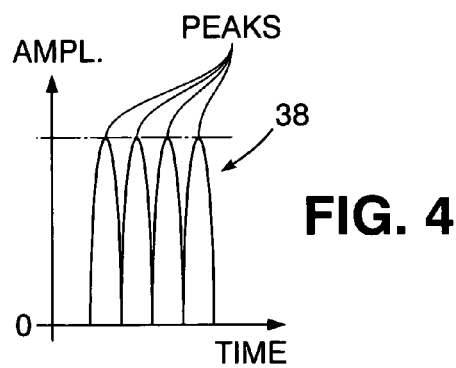
FIG. 4 is an interference pattern graph of the frequency measurements obtained during measurement testings, with and without radiation reflection blockage as respectively shown in FIGS. 1 and 2.

After completion of the second calibration measurement test, the blocker 28 is removed from the targeted surface 14 so that a third scattering measurement test may be performed with the radar radiation transmitted along the path 24 being reflected from the targeted surface 14 at the reflection point 26 for determination of a diffraction correction factor from frequency variation data extracted from the receiver 20, as reflected by the graph shown in FIG. 4.

Heretofore calibration of the radar system 16 from frequency measurement tests was corrupted because of the amplitude of the frequency variations associated with an interference pattern 38 as shown in FIG. 4. The peak frequency amplitude of the interference pattern 38 caused by radiation scattering is however substantially reduced pursuant to the present invention by vertical shift adjustment 40 of the receiver 20 within a transition distance as denoted in FIG. 1. Selection of a maximum interference peak amplitude is thereby effected with respect to the forward scattering interference field undergoing the measurement test, from which the diffraction correction factor is determined by comparison with a theoretical peak frequency amplitude. Upon such determination thereof, the diffraction correction factor is utilized to obtain full frequency calibration of the radar system 16 pursuant to the process diagrammed in FIG. 5.

Figure 5:
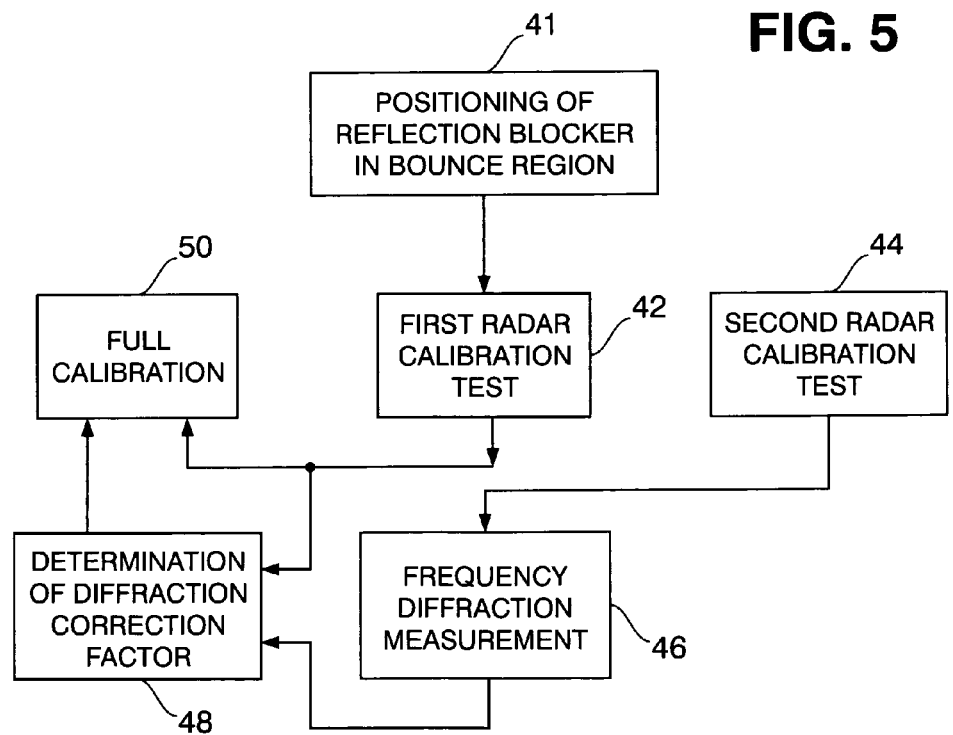
FIG. 5 is a block diagram of the radar calibration calculation method associated with the present invention.

The calibration process involves positioning 41 of the blocker 28, as denoted in FIG. 5, before a frequency measurement test 42 is performed as generally known in the art. When the blocker 28 is thereafter removed, another test 44 is performed through which a frequency diffraction measurement 46 is obtained for use together with data output from the test 42 for determination of the diffraction correction factor 48, which is combined with the data output from the test 42 to provide full calibration 50 with respect to the bi-static radar system 16.

Obviously, other modifications and variations of the present invention may be possible in light of the foregoing teachings. It is therefore to be understood that within the scope of the appended claims the invention may be practiced otherwise than as specifically described.

What is claimed is:

1. A method for full calibration of frequency with respect to radar energy output of a bi-static type of radar system positioned over a targeted reflective surface located between a transmitter and a receiver of the radar system, comprising the steps of: sequentially performing frequency test measurements of the radar energy transmitted to the receiver by radiation from the transmitter along a direct radiation path and by reflection from the targeted surface of the radar energy transmitted along a forward scattering path; blocking said reflection of the radar energy transmitted along said forward scattering path during one of said sequential frequency test measurements to determine a diffraction factor; and combining said diffraction factor with the other of said sequential frequency test measurements to obtain the full frequency calibration.

2. The method as defined in claim 1, wherein said step of blocking reflection involves: use of a blocker operatively positioned on the targeted reflective surface for intersecting said forward scattering path at a predetermined radar bounce location between the transmitter and the receiver of the radar system.

3. The method as defined in claim 2, wherein said blocker comprises; a barrier absorbing the radiated radar energy; and support means for mounting the barrier at an angle to the targeted surface at said bounce location.

4. The method as defined in claim 3, wherein said targeted reflective surface is on top of seawater on which the support means floats.

5. The method as defined in claim 1, wherein said targeted reflective surface is on top of seawater.

6. A method for in-situ calibration of frequency with respect to radar energy output of a bi-static type of radar system positioned over a targeted reflective surface located between a transmitter and a receiver of the radar system, comprising:

performing frequency test measurements of radar energy transmitted to the receiver by radiation from the transmitter along a direct radiation path and by reflection from the targeted surface of the radar energy transmitted along a forward scattering path;

positioning a blocker on the targeted reflective surface, for blocking the reflection of radar energy off the targeted surface, along the forward scattering path;

performing a frequency test measurements of radar energy transmitted to the receiver with the blocker positioned on the targeted reflective surface;

removing the blocker from the targeted reflective surface;

calibrating a diffraction correction factor of the blocker by shifting the receiver vertically through an interference field within a transition distance, while taking radar energy data; and combining the diffraction correction factor with the other frequency test measurements to obtain the full frequency calibration.

7. The method for in-situ calibration of claim 6, wherein the blocker is positioned at an angle of about 30 degrees with respect to the targeted reflective surface, and wherein the blocker comprises a barrier plate having a radar absorbing rim on top and sides thereof, and support means for mounting the blocker at the about 30 degree angle.

8. The method for in-situ calibration of claim 7, wherein the targeted reflective surface is a seawater surface upon which the support means floats.

* * * * *